US 10,863,481 B2

(12) United States Patent
Baldemair et al.

(10) Patent No.: US 10,863,481 B2
(45) Date of Patent: *Dec. 8, 2020

(54) METHODS AND DEVICES FOR DATA TRANSMISSION VIA A PLURALITY OF CARRIERS

(71) Applicant: Telefonaktiebolaget LM Ericsson (publ), Stockholm (SE)

(72) Inventors: Robert Baldemair, Solna (SE); Dirk Gerstenberger, Stockholm (SE); Daniel Larsson, Lund (SE); Henning Wiemann, Aachen (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 75 days.

This patent is subject to a terminal disclaimer.

(21) Appl. No.: 15/983,790

(22) Filed: May 18, 2018

(65) Prior Publication Data

US 2018/0270804 A1 Sep. 20, 2018

Related U.S. Application Data

(63) Continuation of application No. 13/514,063, filed as application No. PCT/EP2010/069630 on Dec. 14, 2010, now Pat. No. 10,009,878.
(Continued)

(51) Int. Cl.
*H04W 72/04* (2009.01)
*H04L 5/00* (2006.01)
(Continued)

(52) U.S. Cl.
CPC ......... *H04W 72/0406* (2013.01); *H04L 5/001* (2013.01); *H04L 5/0053* (2013.01);
(Continued)

(58) Field of Classification Search
CPC ................................................ H04W 72/0406
See application file for complete search history.

(56) References Cited

U.S. PATENT DOCUMENTS

2009/0088195 A1\* 4/2009 Rosa ................. H04W 72/1284
455/507
2009/0163211 A1 6/2009 Kitazoe et al.
(Continued)

FOREIGN PATENT DOCUMENTS

JP 2010226720 A 10/2010
JP 2011508538 A 3/2011
(Continued)

OTHER PUBLICATIONS

Research in Motion, et al., "Carrier Indication for Carrier Aggregation", Discussion and Decision, 3GPP TSG RAN WG1 Meeting #57b, Los Angeles, US, Jun. 29, 2009, pp. 1-4, R1-092417.
(Continued)

*Primary Examiner* — Andrew Lai
*Assistant Examiner* — Sumitra Ganguly
(74) *Attorney, Agent, or Firm* — Coats & Bennett, PLLC

(57) ABSTRACT

A communication system includes a transmitting communication device and a receiving communication device. The transmitting communication device determines a control element, e.g., a control element of a Media Access Control protocol, associated with one of the carriers and provides the control element with an identifier specifying the carrier the control element is associated with. The transmitting communication device sends the control element with the identifier on one of the carriers to the receiving communication device. The receiving communication device receives the control element and determines, from the identifier received with the control element, the carrier the control element is associated with. Further, the receiving communication device determines, on the basis of parameters indicated by
(Continued)

the control element, a data transmission property of the carrier the control element is associated with.

17 Claims, 9 Drawing Sheets

Related U.S. Application Data

(60) Provisional application No. 61/286,335, filed on Dec. 14, 2009.

(51) Int. Cl.
*H04W 52/36* (2009.01)
*H04W 52/54* (2009.01)

(52) U.S. Cl.
CPC ......... *H04L 5/0091* (2013.01); *H04W 52/367* (2013.01); *H04W 52/54* (2013.01); *H04L 5/0007* (2013.01)

(56) References Cited

U.S. PATENT DOCUMENTS

| | | | |
|---|---|---|---|
| 2009/0219910 A1 | 9/2009 | Han et al. | |
| 2010/0150082 A1 | 6/2010 | Shin | |
| 2010/0158147 A1* | 6/2010 | Zhang | H04W 52/242 375/260 |
| 2010/0238863 A1 | 9/2010 | Guo et al. | |
| 2011/0092217 A1* | 4/2011 | Kim | H04W 52/365 455/450 |
| 2011/0235611 A1 | 9/2011 | Chun et al. | |
| 2012/0281633 A1 | 11/2012 | Kim et al. | |

FOREIGN PATENT DOCUMENTS

| | | |
|---|---|---|
| JP | 2013509074 A | 3/2013 |
| RU | 2007144702 A | 6/2009 |
| WO | 2006116102 A2 | 11/2006 |
| WO | 2006126079 A2 | 11/2006 |
| WO | 2009108903 A2 | 9/2009 |
| WO | 2011049359 A2 | 4/2011 |

OTHER PUBLICATIONS

Qualcomm Europe, "Multicarrier Control for LTE-A", Discussion and Decision, 3GPP TSG RAN WG1 #58, Aug. 24, 2009, pp. 1-6, Shenzhen, CN, R1-093118.

NEC, "Details on Carrier Aggregation Signaling", 3GPP TSG RAN WG2 #67bis, Miyazaki, Japan, Oct. 12, 2009, pp. 1-4, R2-0959950.

Huawei, "Issues on Cross-Carrier PDCCH Indication for Carrier Aggregation", Discussion and Decision, 3GPP TSG RAN WG1 meeting #58, Aug. 24, 2009, pp. 1-6, Shenzhen, CN, R1-093047.

3rd Generation Partnership Project, "3rd Generation Partnership Project; Technical Specification Group Radio Access Network; Evolved Universal Terrestrial Radio Access (E-UTRA); Multiplexing and channel coding (Release 8)", Technical Specification, 3GPP TS 36.212 V8.8.0, Dec. 1, 2009, pp. 1-60, 3GPP, France.

Interdigital Communications, LLC, "Cross Carrier Operation for Bandwidth Extension", Discussion/Decision, 3GPP TSG-RAN WG1 Meeting #58, Aug. 24, 2009, pp. 1-8, Shenzhen, CN, R1-093067.

3rd Generation Partnership Project,"3rd Generation Partnership Project; Technical Specification Group Radio Access Network; Evolved Universal Terrestrial Radio Access (E-UTRA) Medium Access Control (MAC) protocol specification (Release 9)", Technical Specification, 3GPP TS 36.321 V9.0.0, Sep. 1, 2009, pp. 1-47, 3GPP, France.

3rd Generation Partnership Project, "3rd Generation Partnership Project; Technical Specification Group Radio Access Network; Feasibility study for Further Advancements for E-UTRA (LTE-Advanced) (Release 9)", Technical Report, 3GPP TR 36.912 V9.0.0, Sep. 1, 2009, pp. 1-55, 3GPP, France.

Rapporteur (NTT Docomo), "TR36.912 Annex A3: Self evaluation results", 3GPP TSG RAN Meeting #45, Seville, Spain, Sep. 15, 2009, pp. 1-41, RP-090744.

3rd Generation Partnership Project, "Extract of 3GPP Release 8 Specifications", Mar. 1, 2009, pp. 1-24, RP-090998.

FDD RIT Component of SRIT, "LTE Release 10 & Beyond (LTE-Advanced)", RP-090745, TR36.912 Annex C1, Sep. 22, 2009, pp. 1-52, 3GPP.

FDD RIT Component of SRIT, "LTE Release 10 & Beyond (LTE-Advanced)", RP-090746, TR36.912 Annex C2, Sep. 17, 2009, pp. 1-42, 3GPP.

FDD RIT Component of SRIT, "LTE Release 10 & Beyond (LTE-Advanced)", RP-090747, TR36.912 Annex C3, Sep. 17, 2009, pp. 1-8, 3GPP.

ZTE, "Considerations on scheduling in carrier aggregation", 3GPP TSG RAN WG2 Meeting #66bis, Los Angeles, US, Jun. 29, 2009, pp. 1-4, R2-093886, 3GPP.

3rd Generation Partnership Project, "3rd Generation Partnership Project; Technical Specification Group Radio Access Network; Evolved Universal Terrestrial Radio Access (E-UTRA) Medium Access Control (MAC) protocol specification (Release 8)", Technical Specification, 3GPP TS 36.321 V.8.3.0, Sep. 1, 2008, pp. 1-36, 3GPP.

* cited by examiner

METHODS AND DEVICES FOR DATA TRANSMISSION VIA A PLURALITY OF CARRIERS

RELATED APPLICATIONS

This application is a continuation of U.S. patent application Ser. No. 13/514,063 filed 5 Sep. 2012, which is a national stage application of PCT/EP2010/069630, filed 14 Dec. 2010, which claims the benefit of U.S. Provisional Application Ser. No. 61/286,335 filed 14 Dec. 2009, the disclosures of each of which are incorporated herein by reference in their entirety.

TECHNICAL FIELD

The present invention relates to methods for data transmission via a plurality of carriers.

BACKGROUND

In mobile communication networks, e.g., according to the technical specifications (TSs) of the Third Generation Partnership Project (3GPP), concepts have been introduced according to which several carriers operated in different frequency channels can be bundled in a single radio link. These concepts are also referred to as carrier aggregation.

For example, in 3GPP Long Term Evolution (LTE) Release 10, in the following also referred to as LTE Rel-10, carrier aggregation implies aggregation of multiple component carriers of narrower bandwidth. Each backward compatible component carrier would then, to an LTE terminal, appear as and provide all the capabilities of an LTE carrier. At the same time, an LTE Rel-10 terminal would be able to access the entire aggregation of multiple carriers, thus experiencing an overall wider bandwidth with corresponding possibilities for higher data rates. Note that carrier aggregation may be useful also for a total bandwidth below 20 MHz, e.g., for a pair of 5 MHz carriers. Sometimes component carriers are also referred to as cells, more specifically as primary cell (Pcell) and secondary cells (Scell).

The aggregated component carriers may be adjacent to each other. However, in more general terms the carrier aggregation may also allow for non-adjacent component carriers, including carriers in different frequency bands, or both adjacent and non-adjacent component carriers. Thus, the introduction of carrier aggregation as part of LTE Rel-10 allows for spectrum aggregation, i.e., the simultaneous usage of different non-contiguous spectrum fragments for communication in a downlink (DL) direction to a single mobile terminal or in an uplink (UL) direction from a single mobile terminal.

In 3GPP LTE Release 8, in the following also referred to as LTE Rel-8, a radio base station referred to as evolved Node B (eNB) and the mobile terminal use control elements (CEs) of a Medium Access Control (MAC) protocol to exchange control information such as buffer status reports, power headroom reports and others. A list of MAC CEs is provided in section 6.1.3 of 3GPP TS 36.321, "Evolved Universal Terrestrial Radio Access (E-UTRA), Medium Access Control (MAC) protocol specification", which is incorporated herein by reference. However, these known ways of exchanging information do not address the carrier aggregation scenario of LTE Rel-10, in which information exchange with respect to a plurality of different carriers may be necessary.

Accordingly, there is a need for techniques which allow for efficiently conveying control information between nodes which are transmitting data via a plurality of carriers.

SUMMARY

According to an embodiment of the invention, a method of data transmission via a plurality of carriers is provided. The method may be implemented in a transmitting communication device. According to the method, determining a control element associated with one of the carriers is determined. The control element is provided with an identifier specifying the carrier the control element is associated with. The control element with the identifier is sent on one of the carriers.

According to a further embodiment of the invention, a method of data transmission via a plurality of carriers is provided. The method may be implemented in a receiving communication device. According to the method, a control element is received from one of the carriers. From an identifier received with the control element it is determined which one of the carriers the control element is associated with. On the basis of parameters indicated by the control element, a data transmission property of the carrier the control element is associated with is determined.

According to a further embodiment of the invention, a communication device for data transmission via a plurality of carriers is provided. The communication device may be a radio base station or a mobile terminal. The communication device is provided with a processing system and a transmitter. The processing system is configured to determine a control element associated with one of the carriers and to provide the control element with an identifier specifying the carrier the control element is associated with. The transmitter is configured to send the control element with the identifier on one of the carriers.

According to a further embodiment of the invention, a communication device for data transmission via a plurality of carriers is provided. The communication device may be a radio base station or a mobile terminal. The communication device is provided with a receiver and a processing system. The receiver is configured to receive a control element from at least one of the carriers. The processing system is configured to determine, from an identifier received with the control element, which one of the carriers the control element is associated with. Further, the processing system is configured to determine, on the basis of parameters indicated by the control element, a data transmission property of the carrier the control element is associated with.

According to a further embodiment of the invention, a communication system is provided. The communication system includes a transmitting communication device and a receiving communication device. The transmitting communication device is configured to determine a control element associated with one of the carriers and to provide the control element with an identifier specifying the carrier the control element is associated with. Further, the transmitting communication device is configured to send the control element with the identifier on one of the carriers. The receiving communication device is configured to receive the control element and to determine, from the identifier received with the control element, the carrier the control element is associated with. Further, the receiving communication device is configured to determine, on the basis of parameters indicated by the control element, a data transmission property of the carrier the control element is associated with.

According to further embodiments, other methods, devices, or computer program products including program code to be executed by a processor for implementing the methods may be provided.

DETAILED DESCRIPTION OF EMBODIMENTS

In the following, the invention will be explained in more detail by referring to exemplary embodiments and to the accompanying drawings. The illustrated embodiments relate to concepts for controlling carrier aggregation in radio communication between mobile terminals and an access node. In the illustrated examples, it will be assumed that the radio communication is implemented according to 3GPP LTE. However, it is to be understood that the illustrated concepts may also be applied in other types of mobile communication networks.

Figure 1:
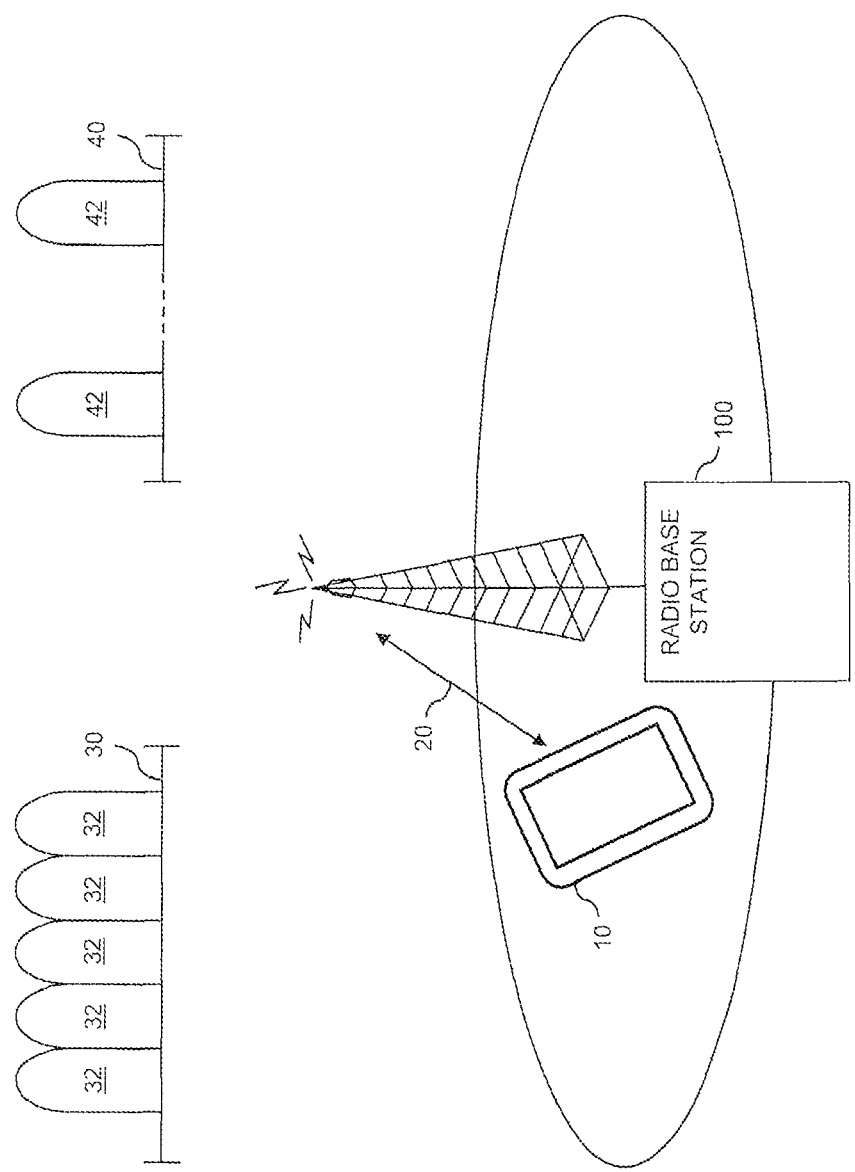
FIG. 1 schematically illustrates a mobile communication network environment in which concepts of data transmission using carrier aggregation according to an embodiment of the invention are applied.

FIG. 1 schematically illustrates a mobile communication network environment, i.e., infrastructure of a mobile communication network, represented by radio base station 100 and a mobile terminal 10 to be used in the mobile communication network. The mobile terminal 10 may be, e.g., a mobile phone, portable computer, or other type of user equipment (UE). In the following, the mobile terminal 10 will also be referred to as UE. As illustrated, the mobile terminal 10 communicates with the access node 100 via a radio link 20. In accordance with the illustrated 3GPP LTE scenario, the radio base station 100 may be an eNB and the radio link 20 may be established using the Uu radio interface. The radio link 20 may carry data traffic in the DL direction from the radio base station 100 to the UE 10 and/or in the UL direction from the UE 10 to the radio base station 100.

In accordance with the concepts as described herein, carrier aggregation may be used for the radio communication between the mobile terminals 10 and the radio base station 100. That is to say, a constellation of multiple component carriers may be used for transmitting radio signals on the radio link 20 between the UE 10 and the radio base station 100. In FIG. 1, different exemplary constellations 30, 40 are illustrated. The constellation 30 is illustrated as including adjacent component carriers 32. For example, the component carriers 32 may correspond to LTE Rel-8 carriers each having a bandwidth of 20 MHz. Since in the illustrated example the number of the component carriers 32 in the constellation 30 is five, carrier aggregation can be used to extend the overall transmission bandwidth to a wider total bandwidth of 100 MHz. The constellation 40 is illustrated as including non-adjacent component carriers 42. For example, the component carriers 42 may correspond to LTE Rel-8 carriers each having a bandwidth of 20 MHz. Since in the illustrated example, the number of the component carriers 42 in the constellation 40 is two, carrier aggregation can be used to extend the overall transmission bandwidth to a wider total bandwidth of 40 MHz. The constellation 40 is an example of using carrier aggregation as a tool for spectrum aggregation and efficient utilization of a fragmented spectrum.

Figure 2:
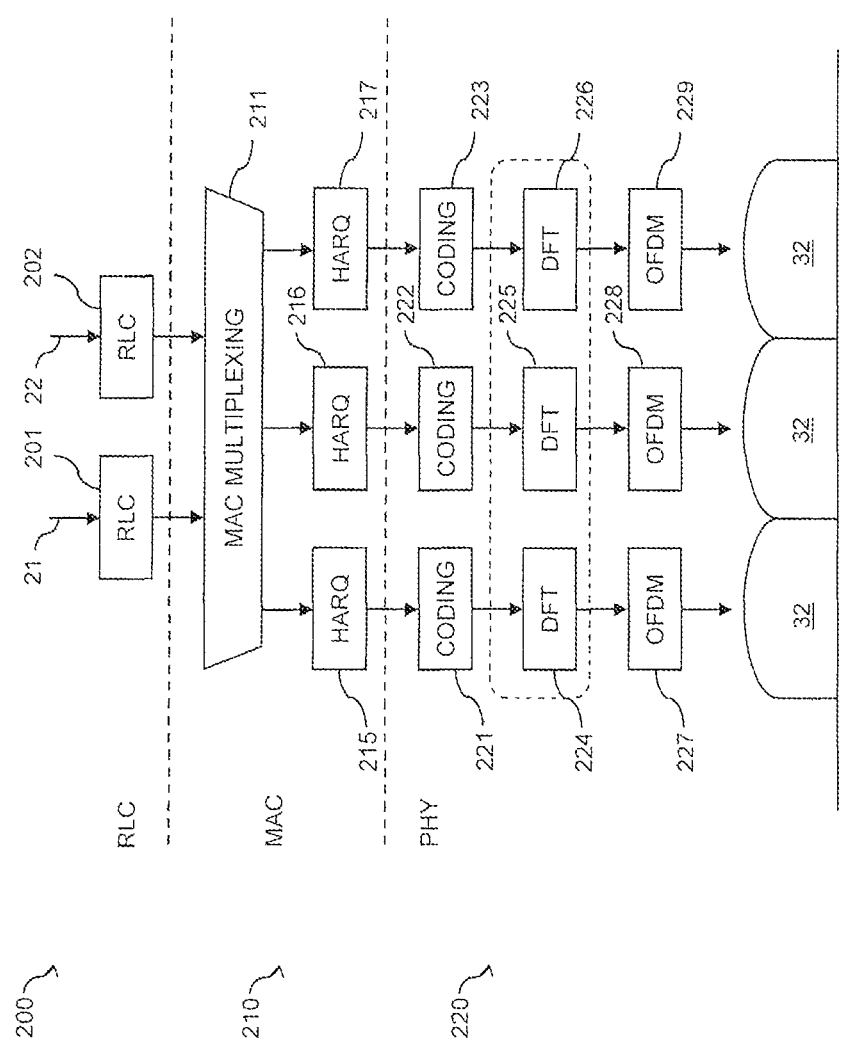
FIG. 2 schematically illustrates processing of data flows in a communication device using carrier aggregation.

FIG. 2 illustrates a block diagram for illustrating an exemplary scenario of data processing in carrier aggregation according to LTE Rel-10. In FIG. 2, a constellation of three adjacent component carriers 32 is illustrated, which may each correspond to an LTE Rel-8 carrier and may be aggregated to an LTE Rel-10 carrier. It is to be understood that the constellation of component carriers 32 as illustrated in FIG. 2 is merely an example and that the data processing of FIG. 2 may be applied in a corresponding manner to any other constellation of component carriers.

In carrier aggregation according to LTE Rel-10, the data streams related to the different component carriers 32 are aggregated above the HARQ (Hybrid Automatic Repeat Request) functionality as shown in FIG. 2. This implies that HARQ retransmissions are performed independently per component carrier 32. Transmission parameters such as modulation scheme and code rate as well as transmission mode can be selected per component carrier, e.g., using corresponding control signaling. Having a structure allowing for independent operation per component carrier is especially useful in case of aggregating component carriers from different frequency bands with different radio-channel quality.

In the scenario of FIG. 2, multiple data flows 21, 22 to or from the same user and to be transmitted on aggregated component carriers 32 are processed. The processing is accomplished on different protocol layers, which are a Radio Link Control (RLC) layer 200, a MAC layer 210, and a physical (PHY) layer 220. In the RLC layer 200, a separate RLC entity 201, 202 is provided for each of the data flows 21, 22. In the MAC layer 210, a multiplexer 211 multiplexes the data flows to a number of separate data streams, each of which corresponds to one of the component carriers 32. Further, the MAC layer 210 provides a HARQ entity 215, 216, 217 for each of the data streams. In the PHY layer 220, a separate coder 221, 222, 223 is provided for each of the data streams. Further, in the UL direction the PHY layer 220 provides a separate DFT (Discrete Fourier Transform) block 224, 225, 226 for each of the data streams. In the DL direction the DFT blocks 224, 225, 226 are omitted. Moreover, the PHY layer 220 provides a separate OFDM (Orthogonal Frequency Division Multiplexing) block 227, 228, 229 for each of the data streams.

The processing of FIG. 2 is in the UL direction based on DFT-spread OFDM. Corresponding processing entities would thus be implemented in the processing system of a UE, e.g., the UE 10 of FIG. 1. However, corresponding processing is also performed in the eNB, e.g., the radio base station 100 of FIG. 1, for DL transmission towards the UE. The illustrated entities with exception of the DFT blocks 224, 225, 226 would then be implemented in the processing system of the eNB. Transmission on each of the component carriers 32 in the DL direction is based on OFDM.

In order to efficiently convey control information between nodes which are transmitting data via a plurality of carriers, e.g., between the UE 10 and the radio base station 100, concepts as described herein involve transmitting control elements, e.g., MAC CEs, which are provided with a carrier identifier. The carrier identifier specifies the carrier the control element is associated with. Typically, the control element includes information with respect to the carrier it is associated with. Such information may be any type of information transmitted in MAC CEs as described in 3GPP TS 36.321, e.g., a power headroom report (PHR). Further, the control element may also include information for controlling activation and/or deactivation of the associated carrier. In some embodiments, MAC CEs, e.g., as defined in 3GPP TS 36.321, are extended by a component carrier identifier (CCI) which allows for associating the contained information to a particular component carrier.

In more general terms, in some embodiments a transmitter performs data transmission to a transceiver via a plurality of carriers in a communication system, e.g., in a mobile communication system. Here, it is to be understood that it is not necessary to always use all carriers for data transmission. Rather, multiple carriers can be configured, but data be transmitted on only some of the configured carriers, e.g., on one of the carriers. The transmitter determines a control element associated with a first of the carriers. The control element is sent on a second of the carriers with an identifier specifying the first carrier. Typically, the first and the second carrier are different. Optionally, the first and second carrier may be identical. The control elements may indicate parameters specifying transmission properties on the respective carriers.

From an efficiency point of view it is preferable to multiplex MAC CEs on a single component carrier. This applies in particular if the amount of data being available for transmission can be sent on a subset of the available component carriers. So it is possible to configure a plurality of component carriers but use them only as required for the data to be transmitted.

In some embodiments, MAC CEs that do not comprise information related to a particular component carrier do not need to carry a CCI. An example is UE buffer status information. In some embodiments, MAC CEs containing information that corresponds to a plurality but not all component carriers may comprise the CCIs of all these component carriers.

Figure 3:
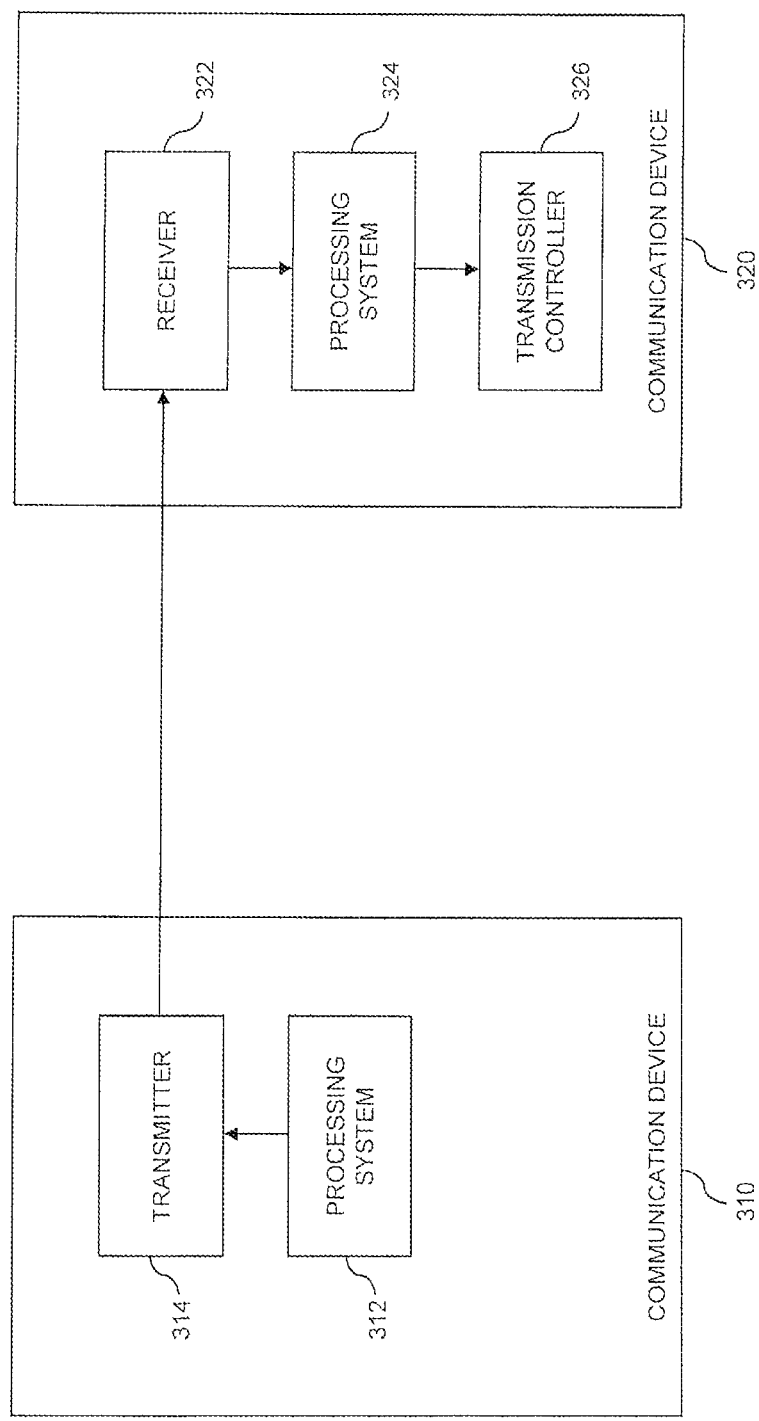
FIG. 3 schematically illustrates a communication system for implementing concepts according to an embodiment of the invention.

FIG. 3 illustrates a communication system which includes a transmitting communication device 310 and a receiving communication device 320. For DL transmissions in the mobile communication network environment of FIG. 1, the transmitting communication device 310 would be the radio base station 100, and the receiving communication device 320 would be the UE 10. For UL transmissions in the mobile communication network environment of FIG. 1, the transmitting communication device 310 would be the UE 10, and the receiving communication device 320 would be the radio base station 100. It is to be understood that the communication system of FIG. 3 may actually be configured for bidirectional communication, which means that the transmitting communication device 310 would also act as a receiving communication device and that the receiving communication device 320 would also act as a transmitting communication device. Further, at least one of the communication devices 310, 320 may also be a relay node.

In the following, it is assumed that data transmission between the transmitting communication device 310 and the receiving communication device is based on carrier aggregation, i.e., uses a constellation of multiple component carriers such as the constellation 30 of component carriers 32 or the constellation 40 of component carriers 42 as explained in connection with FIGS. 1 and 2. For conveying control information from the transmitting communication device 310 to the receiving communication device 320, the transmitting communication device 310 may transmit one or more MAC CE to the receiving communication device 320. In accordance with the above concepts, the MAC CE is provided with one or more CCI to specify the component carrier 32, 42 the MAC CE is associated with. The CCI may be a bit field of the MAC CE. Typically, the MAC CE indicates parameters specifying transmission properties of the component carrier 32, 42 the MAC CE is associated with. For example, the parameters may be any type of parameters transmitted in MAC CEs as described in 3GPP TS 36.321, e.g., parameters of a PHR. Further, the parameters may also relate to an activation status of the associated component carrier 32, 42 and/or control activation and/or deactivation of the associated component carrier 32, 42 at the receiving communication device 320. In some scenarios, the MAC CE may be sent from the transmitting communication device 310 to the receiving communication device 320 on the same component carrier 32, 42 to which it is associated. In other scenarios, the component carrier 32, 42 on which the MAC CE is sent from the transmitting communication device 310 to the receiving communication device 320 may be different from the component carrier 32, 42 to which the MAC CE is associated. These different component carriers 32, 42 may be assigned to the same transmission direction or to opposite transmission directions. For example, in an exemplary scenario the communication system provides component carriers 32, 42 for the UL direction which are different from component carriers provided for the DL direction, the transmitting communication device 310 corresponds to the radio base station 100, and the receiving communication device 320 corresponds to the UE 10. In this scenario, the MAC CE could be sent on an DL component carrier 32, 42 from the radio base station 100 to the UE 10 and include information with respect to a UL component carrier 32, 42 used for data transmission from UE 10 to the radio base station 100. In another exemplary scenario, the communication system provides component carriers 32, 42 for the UL direction which are different from component carriers provided for the DL direction, the transmitting communication device 310 corresponds to the UE 10, and the receiving communication device 320 corresponds to the radio base station 100. In this scenario, the MAC CE could be sent on an UL component carrier 32, 42 from the UE 10 to the radio base station 100 and include information with respect to a DL component carrier 32, 42 used for data transmission from the radio base station 100 to the UE 10.

As illustrated in FIG. 3, the transmitting communication device 310 includes a processing system 312 and a transmitter 314. The receiving communication device 320 includes a receiver 322, a processing system 324, and optionally also a controller 326.

In the transmitting communication device 310, the processing system 312 is configured to determine the MAC CE, e.g., by obtaining information to be conveyed, such as a PHR. The information may be related to a particular component carrier. For example, the information may be a PHR for a particular component carrier 32, 42. The processing system is further configured to provide the MAC CE with the CCI to specify the component carrier 32, 42 to which the information to be conveyed with the MAC CE relates. The processing system 312 then passes the MAC CE to the transmitter 314. The transmitter 314 is configured to send the MAC CE with the CCI to the receiving communication device 320. This may be accomplished on a component carrier 32, 42 which is different from the one specified by the CCI.

In the receiving communication device 320, the receiver 322 is configured to receive the MAC CE with the CCI as transmitted by the transmitting communication device 310. The processing system 324 is configured to determine the component carrier 32, 42 the MAC CE is associated with. This determination is accomplished on the basis of the CCI received with the MAC CE. Further, the processing system 324 is configured to determine a transmission property of the component carrier 32, 42 the MAC CE is associated with. This determination is accomplished on the basis of the parameters conveyed with the MAC CE, e.g., on the basis of a PHR. The optional controller 326 may be configured to control data transmission on the component carrier 32, 42 the MAC CE is associated with. This control may be based on the transmission property determined by the processing system 324. For example, a transmission power of the component carrier 32, 42 may be controlled.

Accordingly, as outlined above, in concepts according to an embodiment of the invention, one or more CCIs may be comprised in MAC CEs that comprise information related to a particular component carrier. In the following, a detailed implementation of these concepts according to an embodiment of the invention is described based on the PHR. However, it is to be understood that the concepts not limited to any particular MAC CE type. Rather, they may be applied to any other MAC CE that has already been defined for LTE Rel-8 as well as to any CEs defined for later releases.

Figure 4:
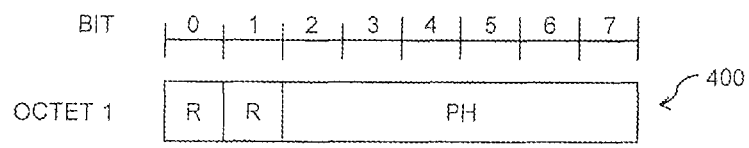
FIG. 4 schematically illustrates the structure of a known control element.

In 3GPP LTE, the power headroom reporting procedure is used to provide the serving eNB with information about the difference between the nominal UE maximum transmit power and the estimated power for UL-SCH (UL Shared Channel) transmission. The power headroom report for LTE Rel-8 is defined in 3GPP TS 36.321, section 6.1.3.6. The format of a power headroom MAC CE 400 according to LTE Rel-8 is illustrated in FIG. 4. As illustrated, this format includes a single octet (OCTET 1) with two reserved bits R (BIT 0, BIT 1) and a PH field (BIT 2-BIT 7) for the PHR. The reserved bits R may be set to 0.

Figure 5:
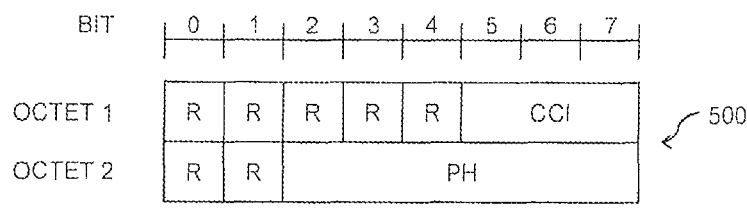
FIG. 5 schematically illustrates the structure of a control element according to an embodiment of the invention.

The concepts as described herein take into consideration that, in particular when the UE uses multiple power amplifiers for its UL transmission, the eNB requires a PHR per component carrier. This may be accomplished by using a format of a power headroom MAC CE 500 as illustrated in FIG. 5. According to this format, a bit field of the MAC CE 500 includes an identifier, corresponding to the above-described CCI, specifying the component carrier the MAC CE 500 is associated with. More specifically, as compared to the format of FIG. 4, the MAC CE 500 is provided with an additional octet (OCTET 1) including a CCI field for the identifier. Further, the additional octet includes a number of reserved bits R (BIT 0-BIT 4). In the illustrated example, the CCI field has a length of three bits (BIT 5-BIT 7). However, in other embodiments a different length of the CCI field may be used, e.g., a length of one bit, two bits, or more than three bits. The other octet (OCTET 2) is similar to the format of the MAC CE 400 of FIG. 4, i.e., includes two reserved bits R (BIT 0, BIT 1) and a PH field (BIT 2-BIT 7) for the PHR.

Using the format of the power headroom MAC CE 500 as illustrated in FIG. 5, the UE may send the power headroom MAC CE on any UL component carrier, which may be different from the component carrier to which the transmitted PHR relates. Further, according to an embodiment, instead of sending a power headroom MAC CE on each UL component carrier, the UE may include multiple PHRs into a single UL MAC PDU (Protocol Data Unit) and associate an identifier with each MAC CE 500.

The relation of the identifiers to the component carriers is specified between eNB and UE, e.g., when a radio resource connection is set up or when a new component carrier is being set up, so that the CCI bit values can be associated with the respective component carrier. When generating the MAC PDU, the UE adds a MAC sub-header for each MAC CE in the beginning of the data block according to 3GPP TS 36.321, section 6.1.2.

Figure 6:
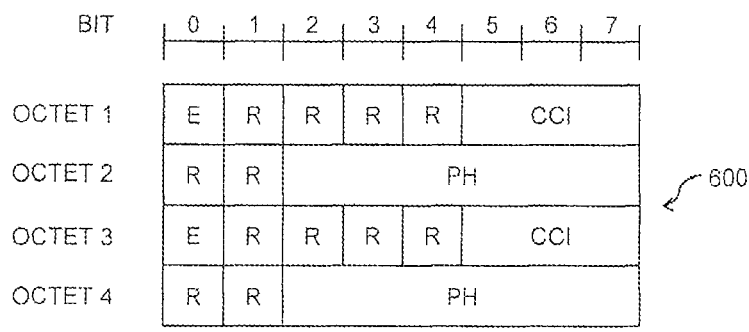
FIG. 6 schematically illustrates the structure of a control element according to a further embodiment of the invention.

When a MAC PDU comprises multiple PHRs for different component carriers it is possible to associate each of them with a separate MAC sub-header. In some embodiments, in order to reduce overhead it may be more efficient though to generate only one MAC CE with multiple PH and CCI fields as shown in FIG. 6. In a format of a MAC CE 600 as illustrated in FIG. 6, the MAC CE 600 comprises additional octets (OCTET 3, OCTET 4) for conveying an additional PHR. A separate CCI field (in OCTET 3, BIT 5-BIT 7) is provided for the additional PHR. For each PHR, an E-bit is provided (OCTET 1, BIT 0, OCTET 3, BIT 0). The E-bit indicates whether another PHR follows in this MAC CE 600 or not, i.e., the upper E-bit in the figure will be set, e.g., to 1 indicating that another PHR will follow while the lower E-bit will be set to another value.

Figure 7:
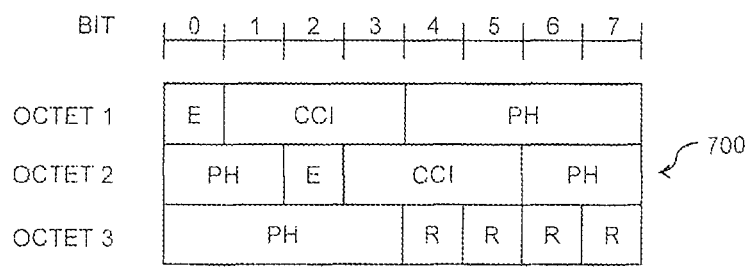
FIG. 7 schematically illustrates the structure of a control element according to a further embodiment of the invention.

In another embodiment, the MAC CE could be compressed as shown in FIG. 7. The format of a compressed power headroom MAC CE 700 as illustrated in FIG. 7 includes the E-bits, the CCI fields and the PH fields as in the structure of FIG. 6, but avoids some of the reserved bits R by placing the E-bit, CCI field, and PH field of a PHR directly adjacent to each other and allowing bit fields to continue from one octet to the next. Again, the E-bit indicates if another PHR follows in this MAC CE or not.

Since the MAC CE formats of FIGS. 5-7 take into account the needs of component carrier aggregation as defined for LTE Rel-10, they may also be referred to as Rel-10 formats, whereas the format of FIG. 4 may be referred to as Rel-8 format.

Figure 8:
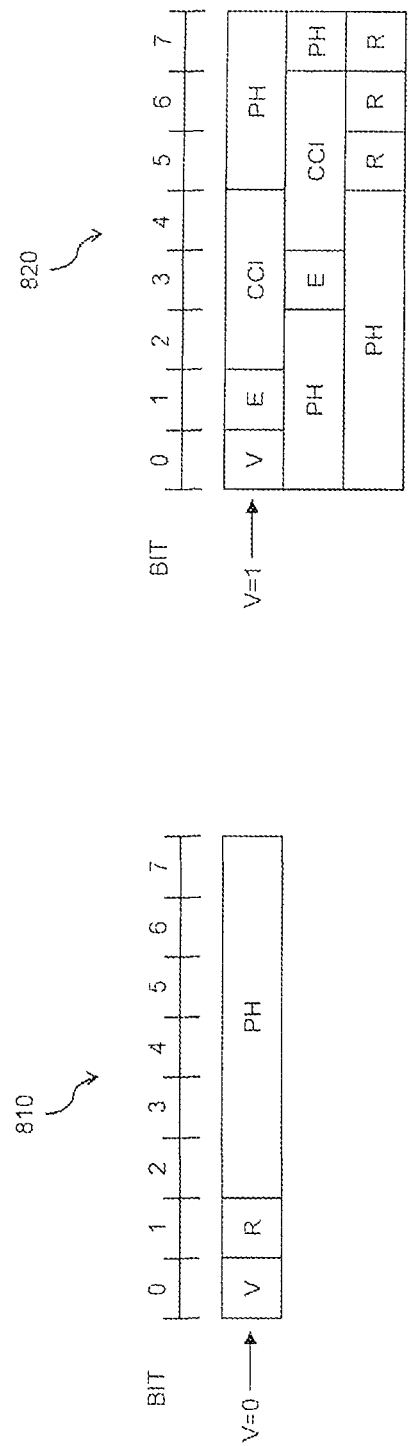
FIG. 8 schematically illustrates the structures of control elements according to a further embodiment of the invention.

In some embodiments, in order not to increase the overhead due to the MAC CE format as described in connection with FIGS. 5-7, the MAC CE format of FIG. 4 may also be used as an alternative, e.g., if a UE is not component carrier capable, i.e., does not support carrier aggregation, or if a UE is configured for a single carrier mode. According to an embodiment, one of the reserved bits in the Rel-8 format of FIG. 4 may be used to indicate whether the single or multi-carrier format is used. FIG. 8 shows a MAC CE 810 in a single-carrier format-8-14, which is similar to the MAC CE 400 of FIG. 4, and a MAC CE 820 in a multi-carrier format, which is similar to the MAC CE 700 of FIG. 7. In both MAC CEs 810, 820, a V-bit (BIT 0 in the first octet, which corresponds to one of the reserved bit in the MAC CE 400 of FIG. 4) is provided which indicates whether the MAC CE is in the single-carrier format or in the multi-carrier format. For example, if a PHR relates to the component carrier on which it is being transmitted, the format of the MAC CE 810 may be used. This is indicated by the V-bit.

Figure 9:
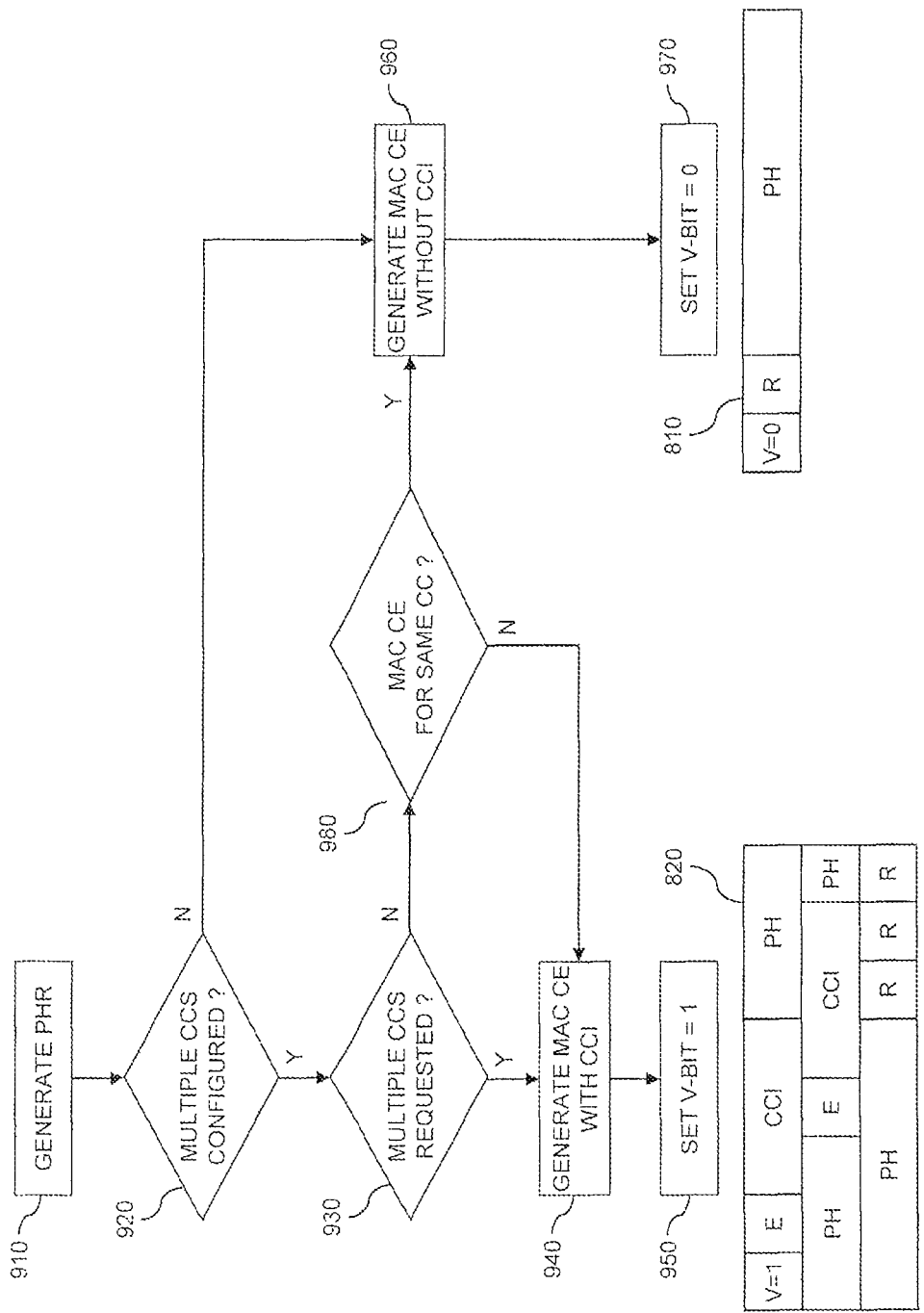
FIG. 9 shows a flowchart for schematically illustrating a process of generating control elements according to an embodiment of the invention.

FIG. 9 shows a flow chart for illustrating an example of a process of specifying header bits in a MAC PDU. As in the preceding examples, the PHR may be replaced by any other control element type. The process is for example executed in a transmitter of an LTE system, e.g., in the transmitting communication device 310 of FIG. 3. For UL transmission, the process may be executed in the processing system of a UE, e.g., the UE 10, prior to forwarding the MAC PDU to the transmitter for transmission over a wireless link to the respective receiver. For DL transmission the process may be executed in the processing system of a radio base station or node B, e.g., the radio base station 100, prior to forwarding the MAC PDU to the transmitter for transmission over a wireless link to the respective receiver. Accordingly, the process may be executed by the processing system 312 in the transmitting communication device 310 of FIG. 3.

At step 910, a PHR is generated. The PHR relates to a particular component carrier.

At step 920, it is determined whether multiple component carriers (CCs) are configured. If this is the case, as indicated by branch "Y", the method continues with step 930. If this is not the case, as indicated by branch "N", the method continues with step 960.

At step 930, it is determined whether multiple component carriers (CCs) are requested. If this is the case, as indicated by branch "Y", the method continues with step 940. If this is not the case, as indicated by branch "N", the method continues with step 980.

At step 940, a MAC CE with the CCI is generated. This may be accomplished using the multi-carrier format of the MAC CE 820 as illustrated in FIG. 8.

At step 950, the V-bit in the MAC CE generated at step 940 is set to a value indicating that the multi-carrier format is used, in the illustrated example a value of V=1.

At step 960, a MAC CE without CCI is generated. This may be accomplished using the single-carrier format of the MAC CE 810 as illustrated in FIG. 8.

At step 970, the V-bit in the MAC CE generated at step 960 is set to a value indicating that the single-carrier format is used, in the illustrated example a value of V=0.

At step 980, it is determined whether the MAC CE is to be generated for the same component carrier (CC) on which it is to be transmitted. If this is the case, as indicated by branch "Y", the method continues with step 960. If this is not the case, as indicated by branch "N", the method continues with step 940.

Figure 10:
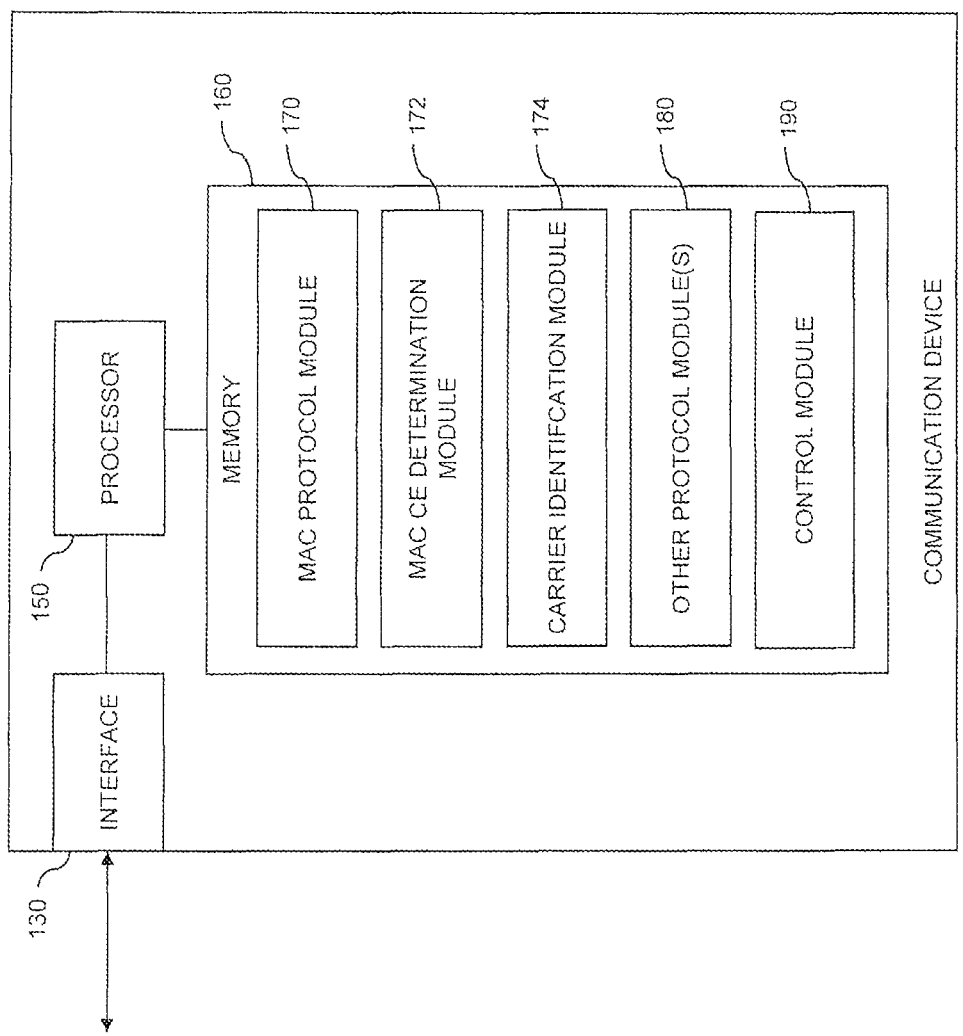
FIG. 10 schematically illustrates a communication device according to an embodiment of the invention.

FIG. 10 schematically illustrates exemplary structures for implementing the above-described concepts in a communication device, e.g., in the radio base station 100 of FIG. 1, in the UE 10 of FIG. 1, or in a relay node.

In the illustrated structure, the communication device 100 includes an interface 130 for data transmission via a plurality of carriers, e.g., using the above described concepts of carrier aggregation. More specifically, the interface 130 may be configured to be used for transmitting and/or receiving the above described control elements including a carrier identifier, e.g., the MAC CEs 500, 600, 700, and/or 820, which include at least one CCI. In addition, the interface 130 may also be configured to be used for transmitting and/or receiving control elements without a carrier identifier, e.g., the MAC CEs 400 or 810. It is to be understood that for implementing transmit functionalities the interface 130 will include one or more transmitters, such as the transmitter 314 of FIG. 3, and that for implementing receive functionalities the interface 130 will include one or more receivers, such as the receiver 322 of FIG. 3. The interface 130 may be configured for data transmission via a radio link. For example, the interface 130 may correspond to the Uu radio interface according to the 3GPP TSs.

Further, the communication device includes a processor 150 coupled to the interface 130 and a memory 160 coupled to the processor 150. The memory 160 may include a read-only memory (ROM), e.g. a flash ROM, a random-access memory (RAM), e.g. a Dynamic RAM (DRAM) or static RAM (SRAM), a mass storage, e.g. a hard disk or solid state disk, or the like. The memory 160 includes suitably configured program code to be executed by the processor 150 so as to implement the above-described functionalities of the communication device. More specifically, the memory 160 may include a MAC protocol module 170 for implementing functionalities of data transmission on the basis of the MAC protocol. Further, the memory 160 may include a MAC CE determination module 172 for implementing functionalities of determining MAC CEs, e.g., the MAC CEs 400, 500, 600, 700, 810, or 820. Further, the memory 160 may also include a carrier identification module 174 for implementing functionalities of providing the MAC CEs with a carrier identifier, e.g., the CCI as provided in the MAC CEs 500, 600, 700, or 820, and/or for determining the carrier a received MAC CE is associated with on the basis of the carrier identifier received with the MAC CE. The MAC CE determination module 172 and/or the carrier identification module 174 may be submodules of the MAC protocol module 170. Further, the memory 160 may include on or more other protocol modules 180 for implementing functionalities of data transmission on other protocol layers, e.g., on the RLC layer and/or on the PHY layer. Moreover, the memory 160 may also include a control module 190, e.g., for implementing control processes on the basis of a received MAC CE. For example, the control module 190 may implement functionalities of the transmission controller 326 as described in connection with FIG. 3.

It is to be understood that the structure as illustrated in FIG. 10 is merely schematic and that the communication device may actually include further components which, for the sake of clarity, have not been illustrated, e.g., further interfaces. Also, it is to be understood that the memory 160 may include further types of program code modules, which have not been illustrated. For example, if the communication device is a UE, the memory 160 may include program code modules for implementing typical functionalities of a UE. Similarly, if the communication device 100 is a radio base station, the memory 160 may include program code modules for implementing typical functionalities of a radio base station. According to some embodiments, also a computer program product may be provided for implementing concepts according to embodiments of the invention, e.g., a computer-readable medium storing the program code and/or other data to be stored in the memory 160.

Figure 11:
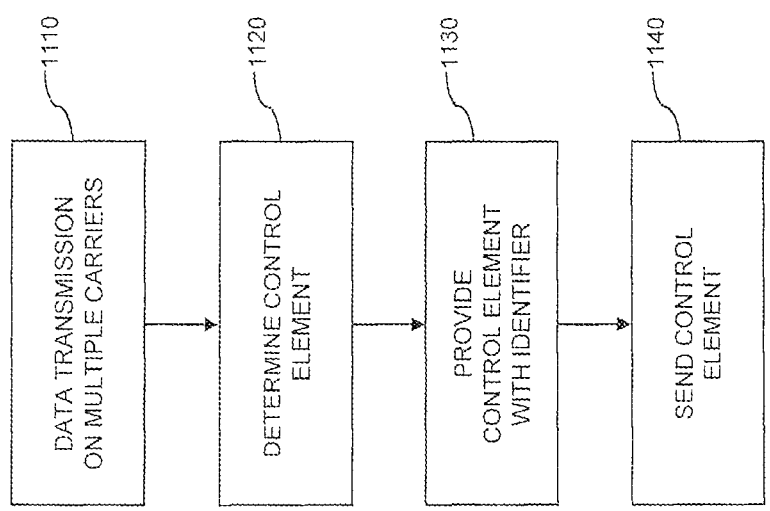
FIG. 11 shows a flowchart for illustrating a method of data transmission according to an embodiment of the invention.

FIG. 11 shows a flowchart for schematically illustrating a method according to an embodiment of the invention. The method may be used for implementing the above-described processes of data transmission via a plurality of carriers. The data transmission may include sending of data and/or receiving of data. The method may be implemented in a communication device, e.g., in a mobile terminal such as the UE 10 of FIG. 1 or in a radio base station such as the radio base station 100 of FIG. 1, or in a communication system, e.g., a communication system including the radio base station 100 and the UE 10 of FIG. 1. More specifically, the method may be implemented in a communication device, e.g., the transmitting communication device 310 as explained in connection with FIG. 3.

At step 1110, data transmission via a plurality of carriers is performed. For example, this may involve using a constellation 30, 40 of multiple component carriers 32, 42 as described in connection with FIG. 1. It is not necessary to always use all carriers for data transmission. Rather, multiple carriers can be configured, but data be transmitted on only some of the configured carriers, e.g., on one of the carriers. According to an embodiment, transmission on each of the carriers may be based on a modulation scheme such as OFDM or DFTS-OFDM (also referred to as Single-carrier Frequency Domain Multiple Access, SC-FDMA). The data transmission may be performed using a corresponding interface of the communication device, e.g., the interface 130 as explained in connection with FIG. 10.

At step 1120, a control element is determined. The control element is associated with at least one of the carriers, i.e., includes information relating to the associated carrier or carriers. The control element may be a control element of a MAC protocol, e.g., a MAC protocol as defined for the 3GPP LTE radio link. More specifically, the control element may be a MAC CE including at least one PHR. In some embodiments, the control element could also include other types of control information, e.g., control information for selective activation or deactivation of the associated carrier or carriers.

At step 1130, the control element is provided with an identifier. The identifier specifies the carrier the control element is associated with. If the control element is associated with a plurality of the carriers, the control element is provided with a respective identifier for each of the associated carriers. The identifier may be a bit field of the control element, e.g., the CCI field as explained in connection with FIG. 5-8. In some embodiments, the identifier may be provided in a bitmap providing one or more bits for each of the associated component carriers.

Steps 1120 and 1130 may be accomplished by a processing system of the communication device, e.g., the processing system 312 of FIG. 3.

At step 1140, the control element with the identifier is sent on one of the carriers. This may be accomplished by a transmitter of the communication device, e.g., the transmitter 314 of FIG. 3 which may be part of the interface 130 of FIG. 10.

Figure 12:
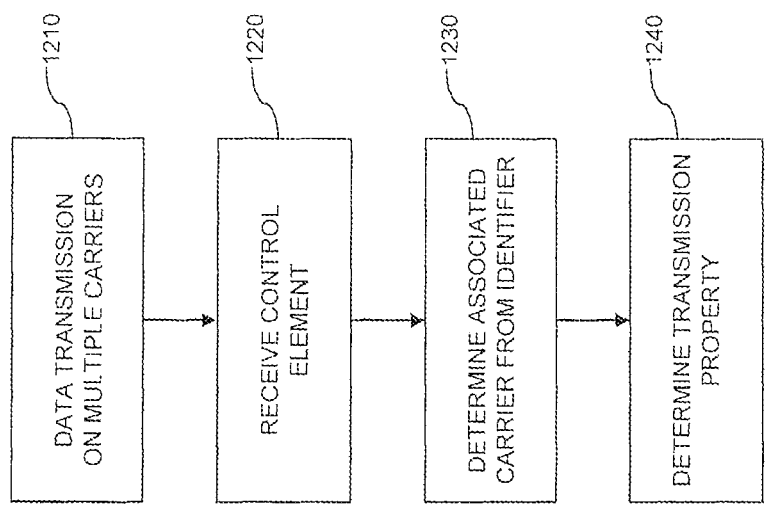
FIG. 12 shows a flowchart for illustrating a method of data transmission according to a further embodiment of the invention.

FIG. 12 shows a flowchart for schematically illustrating a method according to a further embodiment of the invention. The method may be used for implementing the above-described processes of data transmission via a plurality of carriers. The data transmission may include sending of data and/or receiving of data. The method may be implemented in a communication device, e.g., in a mobile terminal such as the UE 10 of FIG. 1 or in a radio base station such as the radio base station 100 of FIG. 1, or in a communication system, e.g., a communication system including the radio base station 100 and the UE 10 of FIG. 1. More specifically, the method may be implemented in the receiving communication device 320 as explained in connection with FIG. 3.

At step 1210, data transmission via a plurality of carriers is performed. For example, this may involve using a constellation 30, 40 of multiple component carriers 32, 42 as described in connection with FIG. 1. It is not necessary to always use all carriers for data transmission. Rather, multiple carriers can be configured, but data be transmitted on only some of the configured carriers, e.g., on one of the carriers. According to an embodiment, transmission on each of the carriers may be based on a modulation scheme such as OFDM or DFTS-OFDM. The data transmission may be performed using a corresponding interface of the communication device, e.g., the interface 130 as explained in connection with FIG. 10.

At step 1220, a control element is received. This may be accomplished by a receiver of the communication device, e.g., the receiver 322 of FIG. 3 which may be part of the interface 130 of FIG. 10. The control element is associated with at least one of the carriers, i.e., includes information relating to the associated carrier or carriers. The control element may be a control element of a MAC protocol, e.g., a MAC protocol as defined for the 3GPP LTE radio link. More specifically, the control element may be a MAC CE including at least one PHR. In some embodiments, the control element could also include other types of control information, e.g., control information for selective activation or deactivation of the associated carrier or carriers.

At step 1230, the carrier the control element is associated with is determined from an identifier received with the control element. In some embodiments, also a plurality of associated carriers may be determined, e.g., from a plurality of identifiers received with the control element. The identifier may be a bit field of the control element, e.g., the CCI field as explained in connection with FIG. 5-8. In some embodiments, the identifier may be provided in a bitmap providing one or more bits for each of the associated component carriers.

At step 1240, a transmission property of the at least one carrier determined at step 1230 is determined. This is accomplished on the basis of parameters indicated by the control element, e.g., on the basis of parameters of a PHR. Further, the data transmission on the determined carrier(s) may be controlled on the basis of information indicated by the control element.

Steps 1230 and 1240 may be accomplished by a processing system of the communication device, e.g., the processing system 324 of FIG. 3.

The methods of FIGS. 11 and 12 may be combined with each other. For example, using the method of FIG. 11 a control element may be generated and sent by one communication device, e.g., the transmitting communication device 310 of FIG. 3, and another communication device may use the method of FIG. 12 to determine information related to a particular carrier.

As can be seen, by using the above described concepts, control information with respect to a plurality of carriers can be conveyed in an efficient manner. The concepts allow for associating control information contained in MAC CEs with particular component carriers. This may be used to reduce the need to schedule a UE on an otherwise inactive or unused component carrier and therefore may be used to reduce the system load but also the battery consumption in the UE.

It is to be understood that the examples and embodiments as explained above are merely illustrative and susceptible to various modifications. For example, the concepts could be used in other types of mobile communication network using carrier aggregation. Also, the concepts may be applied to any number of aggregated carriers. Further, it is to be understood that the above concepts may be implemented by using correspondingly designed software in existing radio base stations or UEs, or by using dedicated hardware in the radio base stations or UEs.

The invention claimed is:

1. A method of data transmission via a plurality of carriers, the method being implemented by a user equipment and comprising:
   determining a control element of a Media Access Control protocol, the control element comprising a power headroom report, the control element and its power headroom report being associated with one of the plurality of carriers, the power headroom report including an E-bit indicating whether another power headroom report follows in the control element;
   providing the control element with an identifier specifying the one of the plurality of carriers that the control element is associated with; and
   sending the control element with the identifier on one of the plurality of carriers.

2. The method of claim 1 wherein the identifier is included in a bit field of the control element.

3. The method of claim 1 wherein the one of the plurality of carriers that the control element is associated with and the one of the plurality of carriers that the control element is sent on are different carriers.

4. The method of claim 1 wherein the control element is associated with the plurality of carriers and is provided with a respective identifier for each of the plurality of carriers.

5. The method of claim 1 wherein the sending the control element comprises multiplexing the control element and at least one additional control element on a single carrier.

6. The method of claim 1 wherein the control element includes a first set of one or more octets comprising the power headroom report, and wherein the control element includes a second set of one or more octets comprising the another power headroom report when the E-bit indicates that the another power headroom report follows in the control element.

7. A method of data transmission via a plurality of carriers, the method being implemented by a radio base station and comprising:
   receiving a control element of a Media Access Control protocol via one of the plurality of carriers;
   determining, from an identifier received with the control element, which one of the plurality of carriers the control element is associated with; and
   determining, based on parameters indicated by the control element, a power headroom report, the power headroom report being associated with the same one of the plurality of carriers as the control element, the power headroom report including an E-bit indicating whether another power headroom report follows in the control element.

8. The method of claim 7 wherein the identifier is included in a bit field of the control element.

9. The method of claim 7 wherein the one of the plurality of carriers that the control element is associated with and the one of the plurality of carriers that the control element is received via are different carriers.

10. The method of claim 7 wherein the control element is associated with the plurality of the carriers and is provided with a respective identifier for each of the plurality of carriers.

11. The method of claim 7 wherein the control element includes a first set of one or more octets comprising the power headroom report, and wherein the control element includes a second set of one or more octets comprising the another power headroom report when the E-bit indicates that the another power headroom report follows in the control element.

12. A user equipment configured to transmit data via a plurality of carriers, comprising:
   a processing system configured to:
      determine a control element of a Media Access Control protocol, the control element comprising a power headroom report, the control element and the power headroom report being associated with one of the plurality of carriers, the power headroom report including an E-bit indicating whether another power headroom report follows in the control element; and
      provide the control element with an identifier specifying the one of the plurality of carriers that the control element is associated with; and
   a transmitter configured to send the control element with the identifier on one of the plurality of carriers.

13. The user equipment of claim 12 wherein the control element includes a first set of one or more octets comprising the power headroom report, and wherein the control element includes a second set of one or more octets comprising the another power headroom report when the E-bit indicates that the another power headroom report follows in the control element.

14. A radio base station configured to transmit data via a plurality of carriers, comprising:
   a receiver configured to receive a control element of a Media Access Control protocol via at least one of the plurality of carriers; and
   a processing system configured to determine, from an identifier received with the control element, which one of the plurality of carriers the control element is associated with, and to determine, based on parameters indicated by the control element, a power headroom report, the power headroom report being associated with the same one of the plurality of carriers as the control element, the power headroom report including an E-bit indicating whether another power headroom report follows in the control element.

15. The radio base station of claim 14 wherein the control element includes a first set of one or more octets comprising the power headroom report, and wherein the control element includes a second set of one or more octets comprising the another power headroom report when the E-bit indicates that the another power headroom report follows in the control element.

16. A communication system for data transmission via a plurality of carriers, comprising:
   a user equipment configured to:
      determine a control element of a Media Access Control protocol, the control element comprising a power headroom report, the control element and its power headroom report being associated with one of the plurality of carriers, the power headroom report including an E-bit indicating whether another power headroom report follows in the control element;
      provide the control element with an identifier specifying the one of the plurality of carriers that the control element is associated with; and
      send the control element with the identifier on one of the plurality of carriers; and
   a radio base station configured to:
      receive the control element;
      determine, from the identifier received with the control element, the one of the plurality of carriers that the control element is associated with; and
      determine, based on parameters indicated by the control element, the power headroom report.

17. The communication system of claim 16 wherein the control element includes a first set of one or more octets comprising the power headroom report, and wherein the control element includes a second set of one or more octets comprising the another power headroom report when the E-bit indicates that the another power headroom report follows in the control element.

* * * * *

UNITED STATES PATENT AND TRADEMARK OFFICE
CERTIFICATE OF CORRECTION

PATENT NO. : 10,863,481 B2
APPLICATION NO. : 15/983790
DATED : December 8, 2020
INVENTOR(S) : Baldemair et al.

Page 1 of 1

It is certified that error appears in the above-identified patent and that said Letters Patent is hereby corrected as shown below:

In the Specification

Column 1, Line 8, delete "2012," and insert -- 2012, now U.S. Pat. No. 10,009,878, --, therefor.

Column 8, Line 64, delete "format-8-14, which" and insert -- format, which --, therefor.

Signed and Sealed this
Fifteenth Day of June, 2021

Drew Hirshfeld
*Performing the Functions and Duties of the
Under Secretary of Commerce for Intellectual Property and
Director of the United States Patent and Trademark Office*